United States Patent [19]
Goldmann et al.

[11] 3,780,568
[45] Dec. 25, 1973

[54] QUANTITATIVE TEST METHOD FOR MEASURING SOLDER-FLUX SURFACE TENSION INTERACTION

[75] Inventors: Lewis S. Goldmann, Ossining; Dexter A. Jeannotte, Clinton Corners; Bodgan Krall, Wappingers Falls, all of N.Y.

[73] Assignee: International Business Machines Corporation, Armonk, N.Y.

[22] Filed: July 27, 1971

[21] Appl. No.: 166,535

[52] U.S. Cl. ................................................ 73/64.4
[51] Int. Cl. ........................................... G01n 13/02
[58] Field of Search ...................... 73/64.4, 439, 302

[56] References Cited
UNITED STATES PATENTS 3,613,456  10/1971  Hopfe et al. ........................... 73/439
2,448,768   9/1948  Cassel .................................. 73/64.4
2,473,553   6/1949  Stokes .................................. 73/64.4
3,426,584   2/1969  Smith ................................... 73/64.4

FOREIGN PATENTS OR APPLICATIONS 1,167,066   4/1964  Germany ............................. 73/64.4

Primary Examiner—Richard C. Queisser
Assistant Examiner—Joseph W. Roskos
Attorney—Kenneth R. Stevens et al.

[57]  ABSTRACT

A process for quantitatively measuring one of the surface tension components for a solder-flux combination by introducing a gaseous ambient bubble internally coated with a liquid flux into a molten solder, and measuring a pressure differential.

11 Claims, 4 Drawing Figures

PATENTED DEC 25 1973　　　　　　　　　　　　　　　3,780,568

FIG. 2A　　99.99% TIN

FIG. 2B　　63% TIN / 37% LEAD

FIG. 2C　　5% TIN / 95% LEAD

INVENTORS
DEXTER A. JEANNOTTE
BOGDAN KRALL
LEWIS S. GOLDMANN

BY Kenneth R. Stevens
ATTORNEY

QUANTITATIVE TEST METHOD FOR MEASURING SOLDER-FLUX SURFACE TENSION INTERACTION

BACKGROUND OF THE INVENTION

This invention relates to a measuring process and more particularly to a measuring process for quantitatively measuring one of the surface tension components of a solder-flux system.

DESCRIPTION OF THE PRIOR ART

The "maximum bubble pressure technique" is commonly used to evaluate surface tension of molten metals. In this technique, the pressure necessary to inject or blow a bubble of a known gas into a reservoir of molten metal provides a quantitative measurement of the surface tension between the molten metal and the gaseous ambient used to form the bubble. If the tube employed to inject the bubble into the molten metal is submerged to a given depth d, the surface tension in dynes per centimeter is approximately:

$p$ (surface tension) $= [(p - \rho g d) r/(2)]$, where $p$ is the pressure necessary to inject the bubble into the metal; $\rho$ is the mass density of the molten metal; $g$ is the acceleration of gravity; and $r$ is the inside diameter of the tube used to inject the bubble into the molten metal if the metal wets the tube, or the outside diameter of the tube if the metal does not wet the tube.

In the specific area of semiconductor chip bonding to a substrate, the controlled chip collapse process is one commonly-used technique. Basically, the substrate surrounding the contact area is coated with a material which renders it non-wettable to a particular solder. Flux coated mounds of solder is the contact area are employed to support a semiconductor chip above the upper surface of the sustrate. During the joining cycle, the solder is heated to a reflow state in order to affect a metallurgical bond. Due to the phenomena of surface tension associated with the solder, the mound of molten solder prevents the chip from coming into contact with the substrate surface. In this joining process, the total components of surface tension exist firstly, between the liquid solid material and the solid substrate surface; secondly, between the liquid solid material and the gaseous ambient; and thirdly, between the solid substrate surface and the gaseous ambient. However, due to the constraints imposed by the non-wettable surface surrounding the contact area, the effects of the components of surface tension between the liquid solid material and the solid substrate surface, and between the solid substrate surface and the gaseous ambient are minimized. Prior to the present invention, no quantitative techniques were known for measuring the remaining surface tension component between the liquid solid material (solder-flux layers in the preferred embodiment) and the gaseous ambient. This remaining surface tension component is extremely critical when joining small semiconductor chips to substrates, because the addition of flux to the bonding process affects the surface tension of solder. Critical control of this surface tension component aids in insuring that the semiconductor chip is maintained at minimum levl above the substrate surface to prevent contact thereto, and avoids the attendant shorting problems which would occur.

The term "wettability" of a solder as known in the art actually takes into consideration all three previously mentioned components of surface tension. The present invention quantitatively determines one of these components, and thus, the test is also a partial measure of the wettability of solder composition in a gneral sense.

Therefore, it is an object of the present invention to provide a quantitative test for measuring the surface tension component of more than a one material interfacial combination against a gaseous ambient.

It is another object of the present invention to provide a quantitative test which is a partial measure of the wettability of more than a one material interfacial combination against a gaseous ambient.

SUMMARY OF THE INVENTION

A quantitative test for measuring a surface tension component by introducing a bubble internally coated with a first material into a molten liquid of a second material, and measuring the attendant pressure necessary to introduce the bubble.

BRIEF DESCRIPTION OF THE DRAWINGS

FIGS. 2A, 2B and 2C show resulting surface tension or wettability characteristics in dynes per centimeter for various commercially available fluxes quantitatively measured according to the present invention for three different solder compositions.

DESCRIPTION OF THE PREFERRED EMBODIMENT

Figure 1:
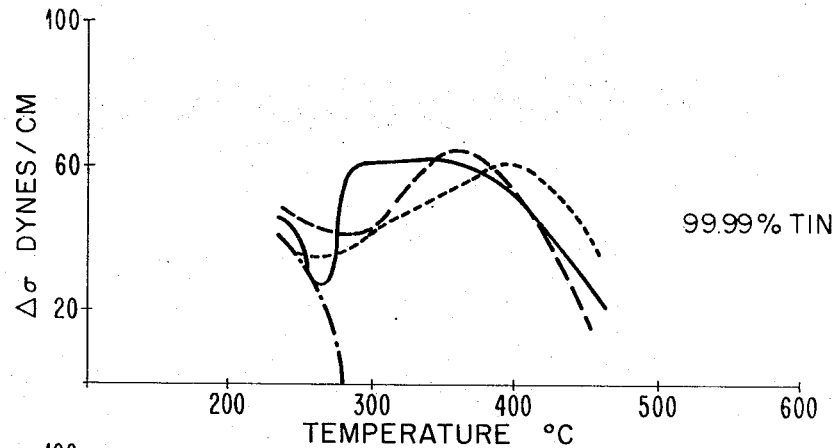
FIG. 1 is a schematic representation of apparatus for implementing applicants' process.
Figure 1:
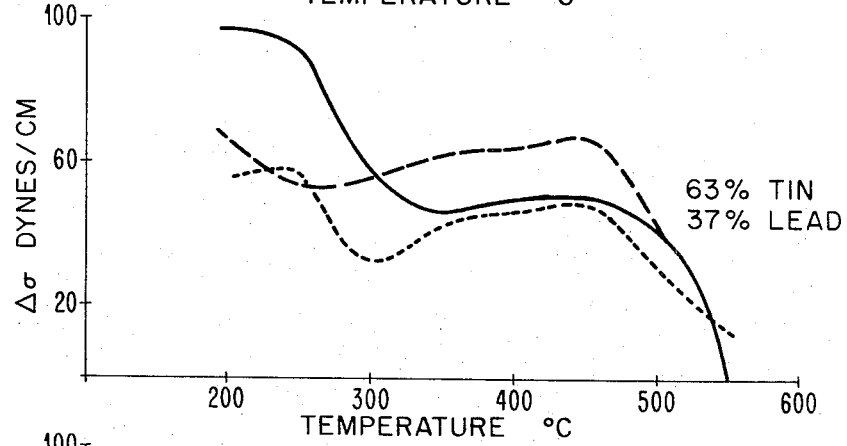
Figure 1:
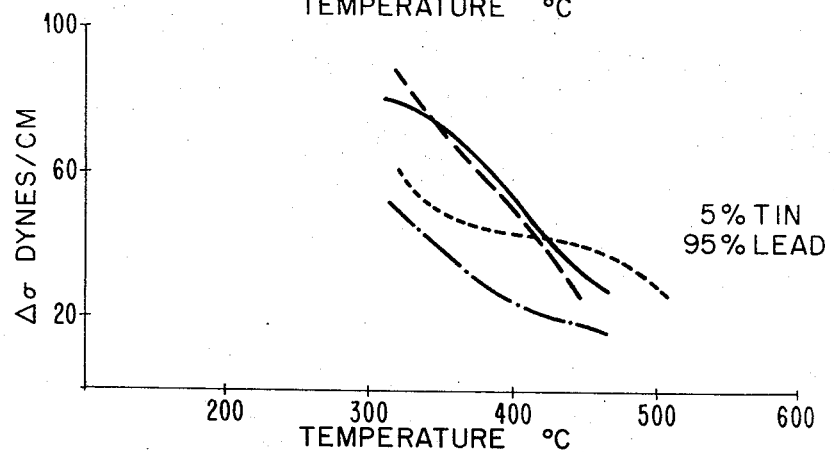
Figure 1:
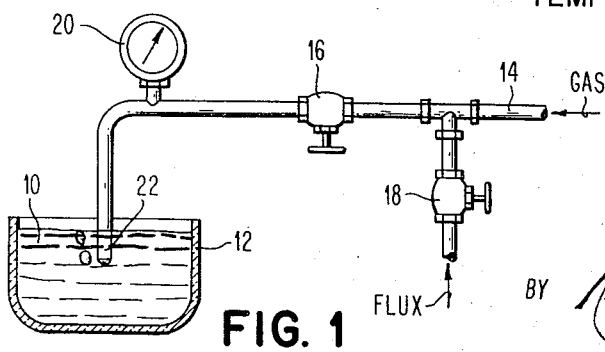

Referring to FIG. 1, it illustrates apparatus capable of carrying out the improved quantitative process analysis. Solder material 10 is introduced into a vessel 12 and then heated to a desired temperature. Thereafter, a gaseous ambient is introduced into line 14 with valve 16 open and valve 18 closed. A pressure transducer 20 is then employed to measure the amount of pressure drop required to inject a spherical gaseous inclusion or bubble into the molten solder 10.

Thereafter, the gaseous ambient is introduced into line 14 with valve 18 open and simultaneously therewith, a flux material is introduced into the system as indicated. Thus, as a gaseous bubble is being formed at exit opening 22, the flux material is heated by the temperature of the molten solder 10 and coats the internal surface of the bubble.

The pressure transducer 20 is then employed to measure the drop in pressure necessary to inject or separate the bubble having an internally flux coated inner surface into the molten solder 10.

An inert gas, for example, forming gas, ammonia, hydrogen or argon is suitable for the process, since it does not react with the molten metal to form byproducts which interfere with the test by introducing a fourth constituent.

FIGS. 2A, 2B and 2C illustrate various quantitative surface tension or wettability measurements for three different solder compositions. Each solder composition is tested against a plurality of different commercially available fluxes. The differently designated curves indicate a different flux for each of th diagrams under varying temperature conditions of the molten solder.

The basic equation previously described is simplified because te measurements reflect a decrease in surface tension in dynes per centimeter, for various molten surface temperatures. The overall decrease in surface tension, $\Delta \rho$ reduces to: $\Delta \rho = [(p1 - p2) r/(2)]$, where p1 is the pressure necessary to inject the gaseous ambient into the molten solder without the addition of flux, and p2 is the pressure necessary to inject the gaseous ambient bubble internally coated with a liquid flux material. Accordingly, the independent variables $\rho$, $g$ and $d$ are eliminated by applying the general equation described above the relationship: $\Delta \rho = \rho 2 - \rho 1$. Elimination of these independent variables facilitate the quantitative process as long as these variables are kept constant when first measuring the surface tension $\rho 1$ of the non-internally coated bubble, and when measuring the surface tension $\rho 2$ of the internally coated bubble.

It is also apparent that the precess can be quantitatively used to measure the characteristics of different solders by varying the solder composition and maintaining the same flux for each different solder material.

Although the preferred embodiment uses a bi-material system comprising flux and solder, the invention is also applicable to other greater than one material systems where a measure of surface tension is desired.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. A method for quantitatively measuring a surface tension component of more than a one material interfacial combination against a gaseous ambient comprising the steps of:
   a. introducing a spherical gaseous inclusion or bubble internally coated by a first material into the liquid state of a second material,
   b. measuring the pressure necessary to inject the internally coated spherical gaseous inclusion or bubble into the liquid state of the second material in order to provide a quantitative surface tension indication.

2. A method for quantitatively measuring a surface tension component of more than a one material interfacial combination against a gaseous ambient as in claim 1 wherein:
   a. the step of introducing a spherical gaseous inclusion includes providing a molten reservoir of the second material and simultaneously injecting a gas and said first material into the molten reservoir.

3. A method for quantitatively measuring a surface tension component of more than a one material interfacial combination against a gaseous ambient as in claim 2, further including:
   a. providing a flux as the first material,
   b. providing molten solder as the second material, and
   c. providing a substantially inert gas as the gaseous ambient in order to determine the surface tension of the flux-solder interfacial combination against the gaseous ambient.

4. A method for quantitatively measuring a surface tension component of more than a one material interfacial combination against a gaseous ambient comprising the steps of:
   introducing a spherical gaseous inclusion or bubble internally coated by a first material into the liquid state of a second material,
   measuring the pressure necessary to inject the internally coated spherical gaseous inclusion or bubble into the liquid state of the second material in order to provide a quantitative surface tension indication,
   measuring the pressure drop necessary to introduce a non-internally coated spherical gaseous inclusion or bubble into the liquid state of the second material, and
   comparing this first pressure indication against the pressure necessary to introduce the internally coated spherical gaseous inclusion or bubble into the liquid state of the second material in order to provide a quantitative measurement of the decrease in surface tension exhibited by the more than one material interfacial combination.

5. A method for quantitatively measuring a surface tension component of more than a one material interfacial combination against a substantially inert gas comprising the steps of:
   introducing a spherical gaseous inclusion or bubble internally coated by a flux, into molten solder,
   measuring the pressure necessary to inject the internally coated spherical gaseous inclusion or bubble into the solder in order to provide a quantitative surface tension indication,
   providing different flux compositions, and
   measuring the surface tension against a standard solder composition over a range of temperatures in order to provide a quantitative indication of the characteristics of the different flux compositions.

6. A method for quantitatively measuring a surface tension component of more than a one material interfacial combination against a substantially inert gas comprising the steps of:
   introducing a spherical gaseous inclusion or bubble internally coated by a flux into molten solder,
   measuring the pressure necessary to inject the internally coated spherical gaseous inclusion or bubble into the solder in order to provide a quantitative surface tension indication,
   introducing a standard flux material into different solder compositions, and
   measuring the surface tension over a range of temperatures in order to provide a quantitative indication of the characteristics of the different solder compositions.

7. A method for quantitatively measuring a surface tension component of more than a one material interfacial combination against a gaseous ambient comprising the steps of:
   providing first and second materials;
   introducing a gaseous inclusion or bubble into the liquid state of the second material,
   coating the internal surface of said bubble with said first material as said bubble is introduced,
   measuring the pressure necessary to inject the internally coated gaseous inclusion or bubble into the liquid state of the second material in order to provide a quantitative surface tension indication.

8. A method for quantitatively measuring a surface tension component of more than a one material interfacial combination against a gaseous ambient as in claim 7 wherein:

the step of introducing a spherical gaseous inclusion includes providing a molten reservoir of the second material and simultaneously injecting a gas and said first material into the molten reservoir.

9. A method for quantitatively measuring a surface tension component of more than a one material interfacial combination against a gaseous ambient as in claim 8, further including:
providing a flux as the first material,
providing molten solder as the second material, and
providing a substantially inert gas as the gaseous ambient in order to determine the surface tension of the flux-solder interfacial combination against the gaseous ambient.

10. A method for quantitatively measuring a surface tension component of more than a one material interfacial combination against a gaseous ambient comprising the steps of:
providing a gas and a first material at a first temperature;
heating a second material to a second temperature, said second temperature being higher than said first temperature and sufficiently high to vaporize said first material;
forming a bubble by introducing said gas and said first marial into the liquid state of said second material;
coating the internal surface of said bubble with said first material during the formation of said bubble; and
measuring the pressure necessary to inject the internally coated bubble into the liquid state of the second material in order to provide a quantitative surface tension indication.

11. A method of quantitatively measuring a surface tension component of more than a one material interfacial combination against a gaseous ambient as in claim 10, further including:
providing a flux as the first material,
providing molten solder as the second material, and
providing a substantially inert gas as the gaseous ambient in order to determine the surface tension of the flux-solder interfacial combination against the gaseous ambient.

* * * * *